United States Patent [19]

Chabal et al.

[11] Patent Number: 4,557,776

[45] Date of Patent: Dec. 10, 1985

[54] PREPRESSING GLASS PLASTIC ASSEMBLIES

[75] Inventors: Joseph Chabal, Gibsonia; Bruce A. Bartrug, Natrona Heights, both of Pa.

[73] Assignee: PPG Industries, Inc., Pittsburgh, Pa.

[21] Appl. No.: 696,277

[22] Filed: Jan. 29, 1985

Related U.S. Application Data

[63] Continuation-in-part of Ser. No. 590,101, Mar. 16, 1984, abandoned.

[51] Int. Cl.[4] ............................................. B32B 31/20
[52] U.S. Cl. .................................... 156/103; 156/104; 156/105; 156/107; 156/312
[58] Field of Search ................................ 156/102–105, 156/312, 382, 107

[56] References Cited

U.S. PATENT DOCUMENTS

| 2,965,527 | 12/1960 | Morris | 156/105 X |
| 3,249,479 | 5/1966 | Boicey | 156/107 X |
| 3,852,136 | 12/1974 | Plumat | 156/103 |
| 3,971,668 | 7/1976 | Pickard et al. | 156/312 X |
| 4,367,108 | 1/1983 | Valimont et al. | 156/107 X |

Primary Examiner—David Simmons
Attorney, Agent, or Firm—Andrew C. Siminerio

[57] ABSTRACT

A method of preliminarily pressing a bent assembly comprising a pair of bent glass sheets and a flexible interlayer comprising a first heating step performed without vacuum, a biasing step, an unbiasing step and followed by a second heating step performed simultaneously with an application of vacuum. When the assembly so prepressed is further laminated under heat and pressure, it develops fewer bubbles after a heat stability test involving exposure to high temperature for an extended period than assemblies further laminated under such heat and pressure conditions after a prepressing step that includes passing the assembly between rollers prior to the further lamination step.

12 Claims, No Drawings

PREPRESSING GLASS PLASTIC ASSEMBLIES

RELATION TO OTHER APPLICATION

This application is a continuation-in-part of U.S. Patent Application Ser. No. 590,101, filed Mar. 16, 1984, now abandoned.

BACKGROUND OF THE INVENTION

I. Field of the Invention

The present invention relates to the preliminary pressing of glass plastic assemblies. Glass plastic assemblies comprise two or more glass sheets with an interlayer of transparent plastic material between each pair of glass sheets. Although not limited in the present invention, the term "glass" also means optically transparent sheets of plastic materials, such as acrylic and polycarbonate plastics, that are often substituted for glass. The term "interlayer" comprises thermoplastic materials such as polyurethanes and plasticized polyvinyl butyral that bond glass sheets together.

The present invention, more particularly, relates to the preliminary pressing of assemblies comprising bent glass sheets, particularly those that have portions that are deemed critical to laminate together, such as sharply bent portions in an assembly of glass sheets bent to nonuniform radii of curvature.

II.A. Technical Problems

Laminated glass sheets are commonly used in cases where safety glass is required, such as in windshields for vehicles and laminated windows. The ability of the interlayer of thermoplastic material to bond the glass sheets together prevents the individual glass sheets from flying about in case of impact and also, the flexibility of the interlayer sheet provides a yielding safety device that prevents the head of an occupant of the vehicle from penetrating the windshield in case of an accident.

To achieve a satisfactory laminated windshield or other laminated product, it is necessary that the glass sheets and plastic interlayer bond together over the entire area of the glass sheets, and it is also necessary that the bonding be such that the delamination does not occur in use. To achieve this desired result, the plastic interlayer must fill the entire space between the glass sheets, and also for the glass sheets to be bonded together over their whole area during the laminating process.

This object of filling the entire space between the glass sheets is difficult to attain, particularly when the glass sheets forming the assembly are shaped to nonuniform curves. In such instances, critical regions are formed in the sharply bent portions of the glass sheets where even a slight displacement or misalignment between the two bent sheets as they are assembled with a sheet of thermoplastic interlayer material therebetween makes it difficult to avoid the breakage of the glass or the formation of bubbles entrapped within the interfacial surfaces between the glass sheets and thermoplastic interlayer sheet.

Several techniques have been suggested and used to laminate bent glass plastic assemblies. In one of these, the assembly is heated to a condition wherein the interlayer is softened, and the assembly passed between a pair of rotating nipper rolls which seal the edge of the glass and force entrapped fluid from between the interfaces beyond the assembly. However, the more complicated the shapes to which glass sheets are bent, the more difficult it is to avoid breakage of the glass sheets as the assemblies are roll pressed between the rotating rolls. In another known process, the assembly is inserted within a flexible envelope which is evacuated and sealed and then the assembly together with the envelope is subjected to elevated heat and pressure. This well known process requires very careful handling to ensure proper insertion of the glass within the envelope or bag and expensive bagging equipment to perform the preliminary pressing operation. When glass sheets are laminated inside plastic bags, some breakage occurs as a result of inserting the assemblies within the bags. Furthermore, evacuation inside the plastic bag pulls the glass sheets against the plastic interlayer when the air is removed and misalignments between the sharply bent areas of the glass sheets would result in breakage. In either case, it is impossible to detect the breakage until the bag and its contents are subjected to a final pressing treatment and the contents removed from the bag. This means that equipment used for the final lamination of assemblies was wasted on assemblies that were already broken. This prevented the maximum utilization of the autoclave equipment used for final lamination.

Still another preliminary pressing method is accomplished by mounting an open ring-like member of fluid-impervious material with its lips engaging the major surfaces of the assembly and its base spaced from the perimeter of the assembly to form an evacuation channel. The evacuation channel is fluid impervious and is connected through a pipe to a source of subatmospheric pressure. The latter type of preliminary pressing operation is highly labor intensive and also requires a special inventory of ring-like members for each production pattern having a unique outline shape and bend.

It would be beneficial for the glass laminating art to develop a technique that eliminates the need for either pressing rolls or plastic bags or plastic evacuating rings forming peripheral evacuating chambers around the assembly.

II.B. Description of Patents of Interest

U.S. Pat. No. 2,965,527 to Morris discloses a method of pressing curved laminated glass assemblies in which an assembly is inserted within a chamber containing air, and air is evacuated from the chamber at the onset of the operation. Sometimes, the shape of the assembly requires that the sheets be clamped together prior to inserting the assembly within the chamber. Either simultaneously with the removal of air or subsequent to the initiation of the removal of air, the assembly within the chamber is heated to an elevated temperature, gas is introduced into the chamber in direct contact with the assembly at the elevated temperature to provide a superatmospheric gaseous pressure. The assembly is maintained at an elevated temperature in the chamber at a superatmospheric pressure only for a sufficient period of time to seal the layer to the glass sheets substantially throughout the entire area of the laminated assembly. The chamber is then cooled while maintaining the superatmospheric pressure until the bonded laminated glass assembly is cooled to a maximum temperature of about 150° to 175° F., the superatmospheric gaseous pressure is released in the chamber and the bonded laminated glass assembly is then removed.

The method described and claimed in the aforesaid patent to Morris has its drawbacks, mainly because of the fact that when vacuum is applied within a chamber, it is difficult to maintain uniform heat within the chamber. Also, since it is difficult to remove the clamps from the assembly while the latter is enclosed within a chamber, it was impossible to avoid severe marks where the clamps were applied to the assembly.

While the Morris patent does not use either prepressing rolls or laminating bags of flexible plastic, or peripheral rings that form a vacuum chamber in surrounding relation to the assembly to be preliminarily pressed, the poor control of heating within a vacuum chamber and the inability to limit the severity of clamp marks on the laminated assembly left room for improvement over the invention patented by Morris.

DETAILED DESCRIPTION OF THE INVENTION

According to the present invention, an assembly comprising two bent glass sheets with a sheet of thermoplastic interlayer material is assembled with the sheet of interlayer material in unbonded relation between the two bent glass sheets. The assembly is preferably oriented in a substantially horizontal position. The assembly is heated to a first temperature range at which a sheet of interlayer material becomes soft but does not bond to the glass sheets while subjecting the assembly to substantially atmospheric pressure. In a first embodiment of this invention, while the assembly is at the first temperature range, a critical portion only of the marginal edge portion of the bent glass sheet is clamped to a corresponding critical portion of the marginal edge portion of the other bent glass sheet to bond the critical portions only of the bent glass sheets to said interlayer along the critical portions of said marginal edge portions while the remainder of the glass sheets remains sufficiently unbonded to allow escape passages for fluid from between the sheets forming the assembly outside the critical portions. After several seconds of clamping, the clamping means are removed to fully expose the assembly. Before the bond established by clamping the critical portion is broken, the fully exposed assembly is exposed to an environment of subatmospheric pressure and elevated temperature hotter than the first temperature range to cause fluid to escape from between the interfacial surfaces of the assembly and to complete the bond between the glass sheets at least about the rest of the marginal portion of the assembly beyond the previously bonded critical portions.

In a second embodiment of this invention the entire marginal edge portion of the preheated glass and plastic laminate is clamped together to edge seal the entire perimeter of the laminate prior to subsequent heating and evacuation.

The benefits of the present invention will be understood better in the light of specific examples that are described hereinafter. In the present invention, clamping takes place only for a few seconds between the step of heating at atmospheric pressure and the subsequent evacuation step. In the method of the prior art as depicted in the Morris patent, clamps are provided in several areas throughout the pressing operation, because the assembly with the clamps applied remains within an enclosed chamber where it is impossible to unclamp the clamps applied to the assembly before the onset of the prepressing operation. Such continuous clamping permanently distorts the interlayer locally and gives rise to local optical defects.

PARTIAL MARGINAL EDGE CLAMPING

According to the present invention, during an initial step of the operation, the assembly to be preliminarily pressed is preheated by any conventional means to develop an interlayer temperature of about 150° F. (66° C.) to 240° F. (116° C.), preferably 175° F. (79° C.) to 225° F. (107° C.), and most preferred, 210° F. (99° C.). The preheating takes place in an oven under atmospheric conditions. Since the oven is exposed to atmospheric conditions, the heating of the oven can be accomplished by a combination of radiant heating and convective heating of circulating hot gas to allow for a much more efficient and uniform heating of the assembly to be preliminarily pressed than can be accomplished in a vacuum environment.

The assembly is then removed from the hot atmosphere for a brief interval and selected portions of the marginal edge portion of the assembly, preferably the critical portions that are located at the relatively sharply bent regions of the bent assembly of nonuniform curvature, are temporarily biased towards one another. These critical portions are the regions where the gaps between the glass plies are usually greatest because of the difficulty in nesting the two bent glass sheets to one another in their sharply bent regions. Biasing is maintained for a period of up to 15 seconds preferably 2 to 6 seconds. At this stage of the process, the assembly remains hot enough to effectively seal the biased regions by bonding the selected portions of the marginal edge portion of the glass sheets to the interlayer at the selected portions, but not too hot to prevent air evacuation from the interfacial surfaces of the assembly from the other locations within the assembly during a subsequent vacuum cycle. For conventional windshield shapes having gently bent central areas merging into end regions of sharper curvature, it has been necessary to bias the edge portions of the assembly in the vicinity of the regions of sharp bending. The biasing is preferably accomplished by hand-held pressing clamps having opposing jaws about 3 inches (7.6 centimeters) long. These clamps have been used effectively to seal the critical regions of the assembly in the vicinity of sharp bending to selectively seal the critical regions after the initial heating step so as to avoid wide gaps between either of the bent glass sheets and the interlayer in the critical regions. In the regions in which clamping is not accomplished, that is, the unbiased portions of the marginal edge portion of the glass sheets, the temperature is not high enough to permit the remainder of the edge portion to seal against the opposite surfaces of the interlayer sheet based on the force provided by the weight of the upper sheet alone or the upper sheet and the interlayer. It is imperative that the assembly be clamped in the critical regions for a limited time only. Too short a clamping period fails to seal the glass sheets to the interlayer in the critical regions. Too long a clamping period causes the interlayer to be locally distorted.

The final stage of the prepressing operation takes place as soon as possible after the clamps are removed from the critical regions. After loosening and removing the clamps, the remaining partially marginal edge bonded assembly is heated to develop an interlayer temperature on the order of 220° F. (104° C.) to 280° F., (138° C.), preferably 230° F. (110° C.) to 260° F. (127° C.) and most preferably, 240° F. (116° C.) in a subatmospheric pressure environment which is a partial vacuum about 23 to 26 inches (584 to 660 millimeters) of mercury below standard atmospheric pressure. After 3 to 5 minutes of exposure in this atmosphere, the interfacial fluid and any volatiles from the plasticizer in the interlayer are evacuated from inside the assembly and the perimeter edge portions seal in those marginal areas through which additional fluid is evacuated and which were not previously sealed during the short clamping step. Releasing the clamps before the final prepressing step involving exposure to subatmospheric pressure at elevated temperature avoids the establishment of obvious marginal marks in the critical marginal areas of the assembly. Continued clamping of the critical regions of the assembly while at elevated temperature of the final prepressing step would cause the interlayer to extrude beyond the assembly in the clamped regions. The temperature of the first heating step is so limited that the momentary clamping of the present invention that takes place prior to the simultaneous evacuation and more intense heating step has a minimal effect on permanently distorting the clamped portion of the plastic interlayer along the marginal edge of the critical region.

Generally, after prepressing, according to this embodiment of the present invention, 95 to 100 percent of the area of the assembly is clear. The prepressed assemblies were then final pressed in a conventional autoclave cycle of 200 psi (14 kilograms per square centimeter) at 275° F. (130° C.) for 90 minutes. Other tests were also performed by prepressing and retaining the prepressed assembly within a heated evacuated autoclave chamber, which was then subjected to the standard commercial autoclave process without removing the prepressed assembly from the evacuated heate chamber. Other tests were successfully performed under shorter cycles and lower pressures at approximately the same temperatures, such as 5 minutes at 70 psi (5 kilograms per square centimeter) after the prepressing operation was completed.

Laminates produced using this prepressing method followed by various final laminating operations in an autoclave were subjected to a boil test in which the resulting laminate was immersed within a container of boiling water for 2 hours and then removed and inspected. No bubbles were observed within the assemblies so tested.

The adhesion of the glass to the interlayer was tested by a qualitative test known as the pummel adhesion test. The pummel adhesion test is usually run as follows. A safety glass laminate is conditioned for testing by subjecting it to a temperature of 0° F.±1° F. for 16±4 hours. The conditioned laminate is held against a heavy metal angle iron set at an incline so that one side of the glass contacts only the edge of the angle iron. The laminate is then repeatedly struck with a flat-heated hammer to pulverize the glass over an area at least 3 inches in diameter until the adherent glass particles are less than ¼ inch in maximum dimension. Loose glass particles are then removed by shaking the laminate upside down, and the adhesion of the laminate is graded on an arbitrary scale of 0 to 10 corresponding to the percentage of exposed interlayer in the pulverized area.

The following table shows the arbitrary scale of pummel adhesion corresponding to the approximate area of bare interlayer that remains after such a test. For a desired impact performance for the laminated windshield, its pummel adhesion value should be in the range of 2 to 6.

| Pummel Adhesion Test Values | |
| --- | --- |
| Percent Bare Interlayer | Pummel Adhesion |
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

In a first series of twenty-one test performed, the pummel adhesion test for the laminates ranged from 2 to 6 with a 3.6 average.

The laminated assemblies were subject to twenty-one tests for mean-break height by dropping a five pound ball. The average height for the twenty-one tests was 20.6 feet with a range of 15.9 to 22.0 feet for those tested. The mean-break height was calculated by the so-called REA method. This involves dropping the 5-pound ball from a height sufficient to penetrate the tested laminate and determining the time it takes the ball to pass between 2 horizontal planes one foot apart vertically below the plane of impact. By calculations involving residual energy analysis (REA), the time it takes the 5-pound ball to traverse the one foot vertical space after the velocity of dropping ball is decelerated on passing through the laminate is compared to the time it would take if the ball drop was effected solely by gravity and the apparatus is calibrated to determine a Mean Break Height in feet based on the timing required by the 5-pound ball. A Mean Break Height of 12 feet passes the ANSI code Z 26.1.

The following experiments were performed on three groups of assemblies of a production pattern for an American Motors windshield. Each assembly of a first group tested was subjected to 8 minutes of evacuation at a mercury level approximately 25 inches (635 mm) in an autoclave set at 340° F. (170° C.) followed by pressurizing the autoclave for 5 minutes at the set temperature of 340° F. (170° C.) to develop an ultimate pressure of 70 psi (5 kg/cm$^2$) and an interlayer temperature of 250° F. (120° C.) before removing the assembly from the autoclave. None of the assemblies had complete clarify after the autoclave step. All of the assemblies showed many bubbles after being immersed in boiling water for 2 hours and then removed for inspection.

Each assembly of a second group was subjected to 4 minutes of preheating in an infra red oven set for 300° F. (150° C.), which increased the interlayer temperature of about 220° F. (105° C.), then removed from the infra red overn for two minutes of exposure to a room temperature environment during which time the interlayer temperature cooled to about 195° F. (90° C.). The assembly was then inserted into a chamber set for 340° F. (170° C.) which established a vacuum of 25 inches (635 millimeters) of mercury and developed an interlayer temperature of about 245° F. (118° C.) after 4 minutes of exposure to heat and vacuum and which increased to an interlayer temperature of 275° F. (135° C.) and a pressure of 70 psi (5 kg/cm$^2$) after 5 additional minutes of exposure to autoclave heat and pressure. The assemblies so treated had better clarity than those of the first group, but still were not completely clear. In addition, the laminated windshields of the second group also developed many bubbles after being subjected to the two-hour boiling water immersion test.

The third group of assemblies was treated in a manner similar to the treatment of the second group, except that during the two minute period of exposure to room temperature environment, each assembly in the third group was clamped along its edge for 5 to 15 seconds in each critical region where the glass sheets appeared to gap from the interlayer. All of the laminated assemblies showed 100 percent of clarity after the 5 minute lamination cycle and survived the two-hour boiling water immersion test without displaying any visible bubbles.

Additional tests were performed to compare various characteristics of laminated assemblies produced by roller prepressing followed by high pressure/high temperature exposure in an autoclave with those produced using the method steps of the present invention comprising preheating the assembly without evacuation in an enclosed furnace set at 300° F. (150° C.) for 3 to 4 minutes to develop an interlayer temperature in the range of 200° F. (93° C.) to 220° F. (105° C.) followed by clamping selected edge portions only where the glass showed a gap with respect to the interlayer for a period of 2 to 10 seconds on any selected edge portions during a 2 minute exposure period and followed by further evacuation for from 10 to 7 minutes, respectively, in a chamber set at elevated temperature of about 340° F. (170° C.) to develop an interlayer temperature of about 235° F. (112° C.) to about 250° F. (121° C.). This prepressing cycle was followed by one of several cycles in which the autoclave pressure was increased to 70 psi (5 kg/cm$^2$) to 200 psi (14 kg/cm$^2$) at an autoclave set for a temperature of 340° F. (170° C.) to develop interlayer temperatures as high as 275° F. (135° C.).

All of the laminates tested in the last enumerated tests readily passed the 5-pound ball drop test of 12 feet, had 100 percent clarity in the autoclaved laminate, showed no bubbles after 2 hours exposure to boiling water, had acceptable pummel tests results in the 2 to 6 range and passed a 4-week humidity exposure test at 120° F. (50° C.) and 100 percent relative humidity by showing less than ¼ inch (0.635 cm) delamination inward form the edge of the assembly. However, the laminates produced according to this embodiment of the invention showed superior tests results to those produced by a method that incorporated prepressing using rollers when subjected to a heat stability test involving exposing the laminated windshields to 300° F. (150° C.) for 2 hours and inspecting for bubbles after such exposure. The incidence of bubbles in laminated windshields subjected to prepressing using rollers was much more frequent than the incidence of bubbles in laminated windshields that were prepressed according to the present invention. This established a superiority for the latter with respect to the heat stability test.

FULL PERIPHERAL EDGE CLAMPING

Further testing of the present invention included preheating the assembly to develop an interlayer temperature of approximately 200° F. (93° C.) and then clamping the entire marginal edge portion of the bent glass sheet to the corresponding marginal edge portion of the other bent glass sheet to bond the entire perimeter of the glass sheets to the interlayer. After approximately 5 seconds of pressing, the clamps were removed and the assembly was simultaneously heated to develop an interlayer temperature of about 220° F. (104° C.) and subjected to a partial vacuum of 24 inches (610 millimeters) of mercury below standard atmospheric pressure. After about 3½ to 5 minutes of exposure, the assemblies were returned to normal atmospheric conditions and subsequently subjected to a conventional autoclave cycle of about 200 psi (14 kilograms per square centimeter) at about 275° F. (130° C.) for approximately 90 minutes.

Examination and testing of the laminates fabricated by full peripheral edge sealing provided the following test results:

(a) 100% of the area of the laminates was clear after final autoclaving
(b) 6 hour boil test—no bubbles were observed within the laminates after being immersed within a container of boiling water for 6 hours
(c) pummel adhesion test values for the laminates ranged from 2 to 4
(d) an average height of 19 feet for the mean-break height test
(e) passed a 4 week humidity exposure test Although the mechanism of this embodiment of the invention is not fully understood, it is clear from the test results that complete peripheral edge clamping provides acceptable test results.

The forms of the invention described herein represents the preferred embodiments and various modifications thereof. It is understood that various changes may be made without departing from the gist of the invention defined by the claimed subject matter that follows.

What is claimed is:

1. A method of preliminarily pressing a laminate assembly of bent glass sheets having a sheet of thermoplastic interlayer material therebetween, comprising:
   (1) providing an assembly comprising two bent glass sheets with a sheet of thermoplastic interlayer material in unbonded relation therebetween;
   (2) heating said assembly to a first temperature range at which said sheet of interlayer material becomes soft but does not bond to said glass sheets;
   (3) biasing selected portions of the marginal edge portion of said bent glass sheets towards one another while said assembly is at said first temperature range to bond said selected portions of said bent glass sheets to said interlayer at said selected portions of said marginal edge portion while remaining unbiased portions of said marginal edge portion of said glass sheets remain unbonded to said interlayer;
   (4) discontinuing said biasing step before said biasing step causes permanent optical distortion of said selected portions, to provide a partially marginal edge bonded assembly;
   (5) exposing said partially marginal edge bonded assembly to an environment of subatmospheric pressure and elevated temperature greater than said first temperature range before the bonds at said selected portions are broken, to provide a preliminarily pressed assembly.

2. A method as in claim 1 wherein said selected portions of said bent glass sheets are critical portions, and wherein said unbonded portions of said marginal edge portions of said bent glass sheets provide for escape passages for fluid from between said glass sheets outside of said critical portions and said exposing step causes said fluid to escape from between said glass sheets to complete said bond at least about said marginal edge portion of said laminate assembly beyond said critical portions that were bonded previously by said biasing step.

3. A method as in claim 2 wherein said laminate assembly is oriented in a substantially horizontal disposition prior to said heating step.

4. A method as in claim 3, wherein said assembly comprises a pair of glass sheets bent to nonuniform curvatures and said critical portions are those portions more sharply bent than the remainder of said glass sheets.

5. A method as in claim 2, wherein said heating step is accomplished under conditions that heat the assembly to develop an interlayer temperature in the range of 175° F. to 225° F. (79° C. to 107° C.), and said heating step performed after said biasing step is accomplished under conditions that heat the assembly to develop an interlayer temperature in the range of 230° F. (110° C. to 127° C.).

6. A method as in claim 2, wherein said biasing step continues for a maximum of 15 seconds.

7. A method as in claim 6, wherein said biasing step discontinues after said biasing continues for from 2 to 6 seconds.

8. A method as in claim 1 wherein said selected portions include the entire marginal edge portions around the perimeter of said bend glass sheets.

9. A method as in claim 8 wherein said laminate assembly is oriented in a substantially horizontal disposition prior to said heating step.

10. A method as in claim 8, wherein said initial heating step prior to said exposure to subatmospheric pressure is accomplished under conditions that heat the assembly to develop an interlayer temperature in the range of 175° F. to 225° F. (79° C. to 107° C.), and said heating step performed after removing the clamping means is accomplished under conditions that heat the assembly to develop an interlayer temperature in the range of 230° F. to 260° F. (110° C. to 127° C.).

11. A method as in claim 8, wherein said biasing step continues for a maximum of 15 seconds.

12. A method as in claim 11, wherein said biasing step discontinues after said biasing continues for from 2 to 6 seconds.

* * * * *

UNITED STATES PATENT AND TRADEMARK OFFICE
CERTIFICATE OF CORRECTION

PATENT NO. : 4,557,776

DATED : December 10, 1985

INVENTOR(S) : Joseph Chabal et al.

It is certified that error appears in the above-identified patent and that said Letters Patent is hereby corrected as shown below:

Column 9, line 20 after "230°F" insert --to 260°F--.

*Signed and Sealed this*

*Twenty-fifth* Day of *February 1986*

[SEAL]

Attest:

DONALD J. QUIGG

*Attesting Officer*     *Commissioner of Patents and Trademarks*